US006344244B1

(12) United States Patent
Schrof et al.

(10) Patent No.: US 6,344,244 B1
(45) Date of Patent: Feb. 5, 2002

(54) METHOD OF PRODUCING CURED COATING FILMS

(75) Inventors: Wolfgang Schrof, Neuleiningen; Reinhold Schwalm, Wachenheim; Erich Beck, Ladenburg; Uwe Meisenburg, Duisburg, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/433,547

(22) Filed: Nov. 4, 1999

(30) Foreign Application Priority Data

Nov. 5, 1998 (DE) ........................................ 198 51 139

(51) Int. Cl.[7] .................................................. C08F 2/48

(52) U.S. Cl. .................. 427/508; 427/385.5; 427/55 B; 427/559; 427/561

(58) Field of Search ................................ 427/508, 558, 427/559, 385.5, 561

(56) References Cited

U.S. PATENT DOCUMENTS 5,637,179 A * 9/1995 Nakayama et al.

FOREIGN PATENT DOCUMENTS

JP 04166941 * 6/1992

* cited by examiner

*Primary Examiner*—Bernard Pianalto
(74) *Attorney, Agent, or Firm*—Keil & Weinkauf

(57) ABSTRACT

The present invention relates to a method of producing at cast one coating film on at least one area of a substrate surface, which comprises at least the following steps in the following order:

a) initiating at least one crosslinking reaction in at least one reactive coating formulation;

b) applying said at least one reactive coating formulation before the onset of said at least one crosslinking reaction on said at least one area of said substrate surface. The present invention additionally relates to a corresponding means of producing at least one coating film on at least one area of a substrate surface, having at least the following elements:

a) at least one storage container for at least one reactive coating formulation, b) at least one exposure unit, preferably a UV exposure unit, more preferably a UV laser, and c) at least one application unit having a nozzle, in particular a spraying head, and/or d) a bell for electrostatic application (ESTA bell), wherein said at least one exposure unit is designed so that the radiation generated in said at least one exposure unit is brought into contact with said at least one reactive coating formulation in said at least one application unit. Also claimed, finally, is a coating film which can be produced by the method of the invention.

19 Claims, 1 Drawing Sheet

METHOD OF PRODUCING CURED COATING FILMS

The present invention relates to a method and a means of producing cured, especially radiation-cured, coating films on a substrate surface.

Coating films are nowadays produced, inter alia with the aid of the method of radiation curing. In radiation curing, a readily processible mixture of reactive starting materials and additives is converted by exposure into a three-dimensional, mechanically stable polymer network. In this procedure, the reactive coating formulation is first applied to the corresponding substrate and in a second step is crosslinked by means of optical exposure, preferably with a UV exposure unit, or by means of electron beam curing. Examples of this are the optically initiated (using photoinitiators) polymerizations of low-viscosity coating formulations of reactive monomers, oligomers and prepolymers, an example being free-radical acrylate polymerization or cationic vinyl ether or epoxy polymerization, or the optical crosslinking of linear polymers having reactive side chains. Use is also made of polymers based on (meth)acrylates, (meth)acrylarnides, maleimide-vinyl ethers, hydrogen abstraction systems, unsaturated polyesters, and acid-curable resins. Typical applications are coatings of paper, skis, furniture, floorings, metals, plastics, and adhesives.

In the case of a radiation-curable coating system, such as, for example, the UV coating or the electron beam curing of three-dimensional surfaces of complex configuration, such as, for example, that of motor vehicles, exposure must take place uniformly in order to avoid uncured areas remaining at critical points such as, for example, on edges or on internal surfaces. Residual uncured areas can result, among other things, in instances of sticking, in the emission of low molecular mass compounds, in some cases associated with an odor nuisance and/or a health hazard, and in deficient gloss and inadequate protection by the coating. This often necessitates expensive reworking, or even the disposal of valuable substrates, which involves high costs. In order to be able to ensure uniform exposure of substrates of large surface area, it has hitherto been necessary to use large-area radiation sources, especially UV lamps, in combination with 3D robotics. This requires high levels of investment in customized exposure units with correspondingly high operating costs and slow cycle times and, possibly, expensive thermal aftertreatment, such as in the case, for example, of dual-cure formulations. A further problem of conventional coating methods occurs when using pigmented coating formulations or coating formulations which have been provided with light stabilizer additives. Such formulations are used primarily for exterior applications. In both of these cases there may be interactions with the light irradiated for exposure: for example, there may be absorption or scattering of UV light. This has the consequence, in turn, that, owing to the “shadow effect” of the light required for activation, the activation of the crosslinking reaction by the photoinitiator system is possibly inadequate. It is therefore very difficult to obtain homogeneous through-cuing, especially in relatively deep coating films.

It is an object of the present invention to provide a method and means with the aid of which a uniform coating film can be produced simply and fairly rapidly without the occurrence of the problems set out above.

We have found that this object is achieved by the method of the invention as claimed in claim 1 and the corresponding means of the invention as claimed in claim 10. Advantageous developments are specified in the subclaims.

The method of the invention constitutes a method of producing at least one coating film, preferably a cured coating film, on at least one area of a substrate surface, said method comprising at least the following steps in the following order:

a) initiating at least one crosslinking reaction in at least one reactive coating formulation;

b) applying, preferably homogeneously, said at least one reactive coating formulation before the onset of said at least one crosslinking reaction on said at least one area of said substate surface.

Initiating at least one crosslinking reaction here means that, although at this point in time the crosslinking reaction is not yet proceeding, a state is created in said at least one reactive coating formulation on the basis of which, after a certain period of time, the crosslinking reaction will proceed.

The method of the invention is notable, accordingly, in particular for the fact that said at least one crosslinking reaction, in contrast to coating methods known from the prior art, is now initiated even prior to the application of the coating formulation to the corresponding substrate surface. This permits homogeneous initiation of the crosslinking reaction and so avoids non-uniform crosslinking of, for example, three-dimensional substrates of complex shape, with which it is often necessary in the case of conventional coating methods to expend considerable effort in order to treat in fact every area of the substrate surface equally, in order thereby to obtain a uniform coating film.

In one preferred embodiment of the method of the invention, in step a) the crosslinking reaction is initiated optically in said at least one reactive coating formulation. This preferably takes place by means of UV exposure or electron beam irradiation of said at least one reactive coating formulation. In a reactive coating formulation which can be used in this embodiment it must be possible to activate a crosslinking reaction optically, so tat from a coating formulation of low viscosity it is possible for a highly viscous, mechanically stable coating film to form.

In the method of the invention, said at least one reactive coating formulation preferably comprises at least one photoinitiator. Said at least one photoinitiator is able to interact with appropriately irradiated light in a manner such that it is made able to initiate the crosslinking reaction in sad at least one coating formulation Examples of this are the optically initiated (using photoinitiators) polymerizations of low-viscosity coating formulations of reactive monomers, oligomers and prepolymers, or the optical crosslinking of linear polymers having reactive side chains. In this case it is possible, inter alia, to mention free-radical acrylate polymcrization and cationic vinyl ether or epoxy polymerization, The coating formulation, which at this point is still of low viscosity, is irradiated with light, preferably with UV light, prior to its application to the substrate surface in question In this case it is relatively simple to achieve homogeneous UV exposure. For example, homogeneous flooding with UV fight can be performed, for example, at the spray nozzle for the reactive coating formulation, or in the corresponding feed line, by carrying out exposure from different sides or configuring the feed line as a UV photoconductor. Here too it is advantageous that with these small dimensions and geometries it is possible to operate not only with conventional UV lamps but also with UV lasers. The latter are used with preference owing to their ease of beam guidance and the possibility of tailoring the laser wavelength to the absorption of the photoinitiator system contained in the reactive coating formulation, as described, for example, in J.-P. Fouassier, *Photoinitiation, Photo-polymerization and Photocuring*, Hanser Publishers, Munich, 1995.

In a further preferred embodiment of the process of the invention, in step a) the crosslinking reaction in said at least one reactive coating formulation is initiated thermally. This means that in this case the crosslinking reaction within said at least one reactive coating formulation is initiated through the establishment of a certain temperature. Here again, as in the case of optical initiation, it is relatively easy to bring the coating formulation not yet applied to the corresponding substrate to a uniform temperature required to initiate the crosslinking reaction, something which is considerably more difficult after the coating formulation has been applied to the substrate, not least owing to the possible thermal interactions of the coating formulation with the substrate.

With the method of the invention it is preferable to take precautions which allow kinetic control of the crosslinking reaction in the reactive coating formulation that is to be initiated, induced and ultimately is to proceed; critical for this is the induction period, as described in J.-P. Fouassier, *Photoinitiation, Photopolymerization and Photocuring*, Hanser Publishers, Munich, 1995, p. 165, FIG. 5.1. This corresponding kinetic adjustment of the crosslinking reaction prevents the exposed reactive coating formulation crosslinking even before it impinges on and is distributed, preferably homogeneously, on the corresponding substrate surface and so undergoing transition to a state which would considerably hamper the uniform distribution of the coating formulation on the substrate surface. The period of time between the initiation of the crosslinking reaction and its actual deployment must be at least sufficient to allow the reactive coating formulation, which is still of low viscosity, to arrive at the substrate surface and flow out thereon to form a film of the desired homogeneity. The crosslinking reaction does not ensue until subsequently, thereby resulting ultimately in a cured coating film. This film has all of the mechanical properties—such as, for example, scratch resistance and elasticity, and good chemical resistance—known of the radiation-cured coating films produced in accordance with the methods to date. In addition to controlling the kinetics of the crosslinking reaction, care is preferably also taken to ensure that the initiation—for example, the UV exposure of the coating formulation—is performed directly, i.e. fractions of seconds, before the coating formulation is applied to the substrate. In other words, the coating formulation is not exposed until shortly before or after leaving the application unit, and care is preferably taken, in addition, to ensure that the distance between the application unit and the substrate surface is a short one.

The temperate of the reactive coating formulation is preferably established in such a way tat even after it has been initiated the crosslinking reaction does not ensue immediately but instead only after a delay. In this context, the reactive coating formulation is prepared such that the necessary application viscosity is retained; for example, by means of higher proportions of reactive diluents. Even still at low temperatures, the latter ensure homogeneous distribution of the coating formulation on the corresponding substrate surface. Preferably, after the cold coating formulation has been applied to the substrate, the substrate is thermally conditioned at up to 140° C., preferably at a temperature below 100° C. By this means, the onset and the progress of the crossing reaction are accelerated.

In a further preferred embodiment of the method of the invention, a sufficiently slow crosslinking reaction is use. This means that the reactive coating formulation is chosen and/or synthesized such that the crosslinking reaction to be triggered therein proceeds sufficiently slowly that, following its initiation, sufficient time remains for the still low-viscosity coating formulation to arrive at the corresponding substrate surface and flow out to form a homogeneous film. One example of a reaction type of this kind is cationic polymerization. According to J.-P. Fouassier, *Photoinitiation, Photopolymerization and Photocuring*, Hanser Publishers, Munich, 1995, p. 214, a system of this kind is indicated with the use of the diglycidyl ether of bisphenol A.

With further preference, the crosslinking reaction is delayed by means of a spatial separation of photoinitiators and the reactive coating formulation constituents to be crosslinked, such as, for example, reactive monomers and prepolymers. This is preferably accomplished by nanostucturing of the coating formulation. Preferably, for example, the photoinitiators contained in the coating formulation are embedded in particles. These particles preferably have a diameter in the nm to m range, with particular preference in the range from 10 nm to 100 m. Accordingly, the crosslinking reaction can be slowed down by the time it takes for the photoinitiators or their cleavage products to diffuse out of the particles In another preferred embodiment, the photoinitiators are not only embedded in particles but also fixed in lattices or dendrimers. The delay time of the crosslinking reaction that is achieved by this means corresponds, then, to the time it takes the reactive constituents of the coating formulation, such as reactive monomers or oligomers, for example, to diffuse into the lattices.

In another preferred embodiment of the process of the invention, the kinetic control of the crosslinking reaction is achieved by means of a so-called dual-cure application. A dual-cure application denotes a resin system which can be cured by two mechanisms: for example, by physical drying and subsequent UV curing, combined UV and electron beam curing, combination of radiation curing and crosslinking by way of isocyanates, possibly in combination with alcohols or amines, it being possible for the isocyanates to be blocked, if desired; combination of radiation curing and crosslinking by way of epoxides, with or without amines, which can be blocked, or by way of acids; amino resins, which are both acid-curable and heat-curable; oxygen-curing systems, such as, for example, allyl compounds or unsaturated fatty acid esters of, for example, epoxides which are present in the reactive coating formulation and NCO-containing compounds on the corresponding substrate surface, in the presence of an optically activatable acid or base, as mentioned, for example, in J.-P. Fouassier, *Photoinitiation, Photopolymerization and Photocuring*, Hanser Publishers, Munich, 1995. This results in a relatively rapid precrosslinking of the epoxides and a delayed post-crosslinking by way of the NCO groups and the OH polyaddition reaction products formed beforehand. Ultimately, therefore, there is dual crosslinking. In this way, the flowout and the final crosslinking can be matched to one another in terms of time.

In a further embodiment of the process of the invention, the kinetic control of the crosslinking reaction, i.e., a controlled reaction regime, is used to establish dynamically the rheological properties during the application phase of coating formulation on the substrate surface. This makes it possible to replace viscosity modifiers (rheological additives), which in turn eliminates typical coating problems such as, for example, the tendency to run on vertical surfaces.

In a further preferred embodiment of the method of the invention, a further step a') is introduced between step a), i.e., the initiation of the crosslinking reaction in at least one reactive coating formulation, and step b), namely the homogeneous application of said at least one reactive coating formulation before the onset of said crosslinking reaction on said at least one area of said substrate surface. This further step a') comprises the admixing of at least one UV stabilizer to said at least one reactive coating formulation. In this embodiment, the UV stabilizers are preferably dissolved in reactive diluents and are admixed homogeneously in preferably turbulent flow shortly after the UV exposure of the photoinitiator-containing reactive coating formulation and shortly before its application to the substrate surface. With this way of mixing in the UV stabilizers there is no adverse effect on the homogeneity of the UV exposure; in other words, the UV radiation curing of the coating formulation is not impaired whereas at the same time long-term UV stabilization is ensured through the addition of UV stabilizers.

Preferably, in a further embodiment of the method of the invention, a further step a") is provided between step a) and step b), in which at least one pigment is admixed to said at least one reactive coating formulation. In this case the pigment, for basecoats, for example, is admixed in turbulent flow, preferably shortly after the initiation of the crosslinking reaction in said at least one reactive coating formulation, for example, by UV exposure of a photoinitiator-containing coating formulation, and shortly before the application thereof. The pigment in this case is preferably dispersed in reactive diluents. Examples of pigments which can be used here are those described in J.-P. Fouassier, *Photoinitiation, Photopolymerization and Photocuring*, Hanser Publishers, Munich, 1995, pp. 285 to 297; by virtue of the subsequent admixing, however, all other conventional pigments which are incompatible with radiation curing, because they absorb and thus are not through-curable, are conceivable, these pigments being such as used, for example, in the automotive sector. This method of mixing in a pigment means that in the case of radiation curing in particular, i.e., initiation of the crosslinking reaction by exposure, in particular by UV exposure, the latter is not impaired in its homogeneity.

Preferably, the method of the invention is also used for repairing or refinishing coating films on a substrate surface. In this case, a manual spray-gun is used to apply said at least one reactive coating formulation before the onset of said at least one crosslinking reaction on said at least one area of said substrate surface. In this case the necessary local application of the coating formulation on the substrate surface, namely precisely at the defective area or area for repair, is ensued. Furthermore, the use of a manual spray-gun is highly practical and is a universal option directly in situ.

The present invention additionally provides a means of producing at least one preferably cured coating film on at least one area of a substrate surface, said means of the invention having at least the following elements:

a) at least one stage container for at least one reactive coating formulation, b) at least one exposure unit, preferably a VU exposure unit, more preferably a UV laser, and c) at least one application unit having a nozzle, in particular a spraying head, and/or d) a bell for electrostatic application (ESTA bell), said at least one exposure unit being designed so that the radiation generated in said at least one exposure unit is brought into contact with the reactive coating formulation in said at least one application unit.

In one preferred embodiment of the means of the invention there is provided at least one optical waveguide with the aid of which the light generated in said at least one exposure unit is brought into contact with the reactive coating formulation in said at least one application unit. Said at least one optical waveguide, preferably two or more optical wave guides, preferably UV waveguides, are sited shortly before the nozzle of the application unit. The application unit is preferably a spraying head or an ESTA bell. Using the waveguides, homogeneous exposure, especially UV exposure, of the reactive coating formulation shortly before leaving the application unit is achieved without great expense. In this context, conventional application systems, such as painting robots, can be used and can be retrofitted with a fiber-coupled exposure facility, preferably a fiber-coupled UV exposure facility, so saving on considerable capital costs and operating costs, since there is no need for expensive baking ovens and exposure arrays. From an environmental standpoint as well this minimal energy requirement is seen as a considerable advantage over the prior art. All other positive features of radiation coating, such as the absence of solvents and of monomer emissions, for example, are retained In addition, there is also an increase in the throughput, since the rate-determining step using the means of the invention is the application of the reactive coating formulation, such as the sprayed application of the reactive coating formulation to the substrate surface, and no longer in addition, as was hitherto the case, the in some cases laborious exposure operation. Furthermore, the footprint of a means of the invention is a fraction of the footprint of a system used to date. Consequently, the management of any desired coating procedure is substantially more flexible. In the automotive industry, for example, it is a great advantage to be able to carry out the coating procedure even in a relatively confined space.

The present invention likewise additionally provides a coat film which can be produced by a method as described above.

Further advantages, features and possible applications of the invention will emerge from the following description of a means of the invention in conjunction with the corresponding figure, wherein:

BRIEF DESCRIPTION OF THE DRAWING

The FIGURE shows a diagrammatic design of a means of the invention for producing at least one cured coating film on at least one area of a substrate surface.

Figure 1:
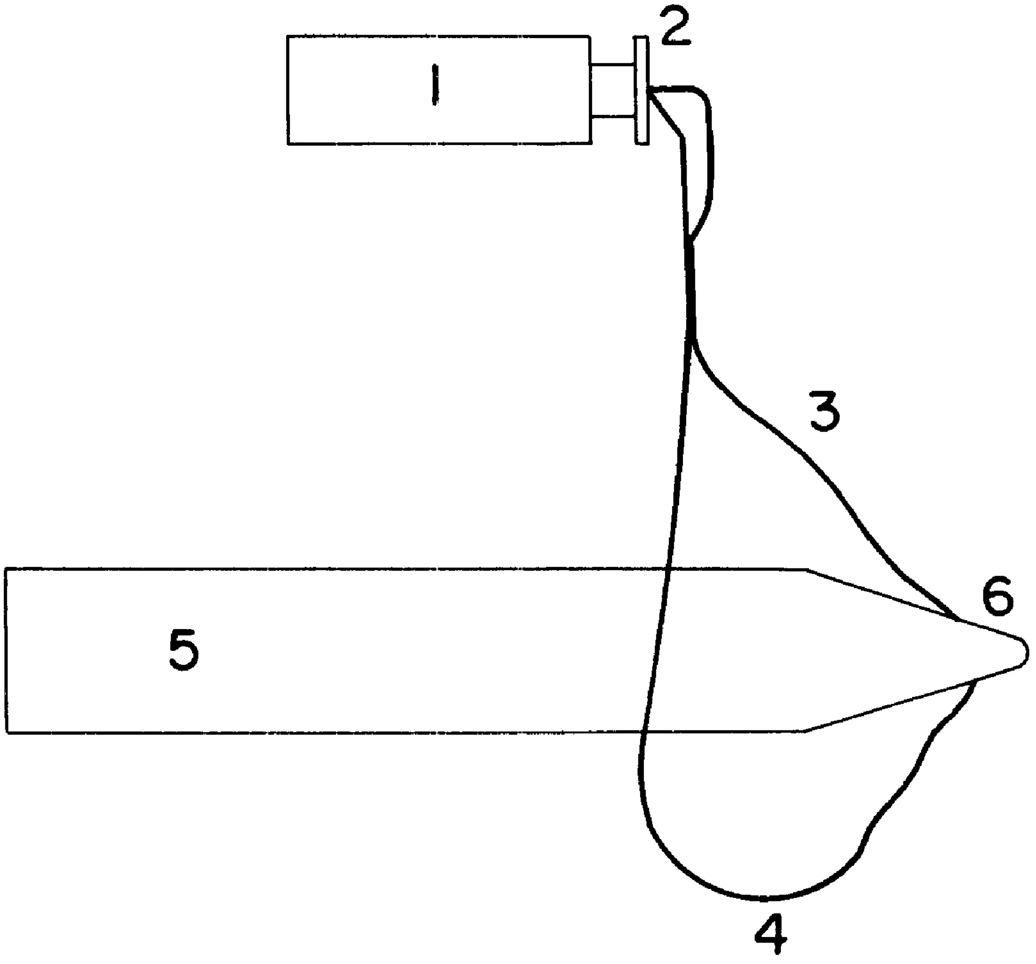
FIG. 1 shows in diagram form the design of a means of the invention. The at least one reactive coating formulation is passed from a storage container via a feedline 5 into the application unit, which is provided with a nozzle 6. Mounted directly before the nozzle outlet are two optical waveguides 3 and 4, preferably UV waveguides. From the exposure unit 1, which is preferably a UV exposure units with particular preference a UV laser, the light is guided via the two optical waveguides 3, 4 by a closure 2 which is arranged on said exposure unit and on which said optical waveguides 3, 4 are mounted, to the application unit specifically, directly before the nozzle 6 of the application unit. By means of this depicted arrangement, in accordance with the invention, of the optical waveguides 3, 4, the reactive coating formulation undergoes homogeneous UV exposure shortly before leaving the application unit directly at the outlet aperture of the nozzle 6. The crosslinking reaction in the reactive coating formulation is therefore initiated at this point The crosslinking reaction is so chosen, or controlled kinetically with He aid of other methods in such a way, that it is initiated at this point, i.e., directly before the outlet aperture of the nozzle 6, but neither is yet triggered nor proceeds. The application unit is arranged at a short distance from the relevant substrate surface to be coated. The purpose of this is to ensure that the period of time between the UV exposure of the reactive coating formulation shortly before the outlet aperture of the nozzle 6 and the arrival of the reactive coating formulation on the substrate surface is sufficiently great, so that the as yet uncrosslinked coating formulation still has sufficient time to flow out to form a homogeneous film on the substrate surface. Only subsequently, by virtue of the ensuing crosslinking reaction, is a cured coating film obtained which has all of the properties, such as scratch resistance and elasticity, for example, and good chemical resistance, which are known of radiation-cured coating films.

We claim:

1. A method of producing at least one coating film on at least one area of a substrate surface, which comprises at least the following steps in the following order:

a) initiating at least one crosslinking reaction in at least one reactive coating formulation to give an initiated formulation of low viscosity;

b) applying the initiated formulation to said area of the substrate surface at a viscosity of the initiated formulation which is sufficiently low to allow the formulation to flow out on the substrate surface to give a uniform film, and c) allowing the initiated crosslinking reaction to progress to give the coating film, wherein the crosslinking reaction of said at least one reactive coating formulation in step a) is initiated optically.

2. A method as claimed in claim 1, wherein the crosslinking reaction of said at least one reactive coating formulation in step a) is initiated by UV exposure.

3. A method as claimed in claim 1, wherein said reactive coating formulation comprises at least one photoinitiator.

4. A method as claimed in claim 1, wherein said crosslinking reaction is kinetically controllable.

5. A method as claimed in claim 4, wherein the kinetic control of said crosslinking reaction is effected by at least one of the following:

varying the temperature of said reactive coating formulation, utilizing a crosslinking reaction which proceeds sufficiently slowly, spatially separating said at least one photoinitiator from the coating formulation constituents to be crosslinked, reducing the reactivity of said at least one photoinitiator.

6. A method as claimed in claim 5 wherein the spatial separation of said at least one photoinitiator from said coating formulation constituents to be crosslinked is achieved by nanostructuring of the coating formulation.

7. A method as claimed in claim 5, wherein said crosslinking reaction a cationic polymerization reaction.

8. A method as claimed in claim 1, further comprising after step a) and before step b) at least the following additional step:

a") admixing at least one pigment to said at least one reactive coating formulation.

9. A method as claimed in claim 1, wherein the application of said at least one reactive coating formulation before the onset of said at least one crosslinking reaction on said at least one area of said substrate surface in step b) takes place with the aid of a manual spray-gun.

10. A method as claimed in claim 1, further comprising after step a) and before step b) at least the following additional step:

a') admixing at least one UV stabilizer to said at least one reactive coating formulation.

11. A method of producing at least one coating film on at least one area of a substrate surface, which comprises at least the following steps in the following order:

a) initiating at least one crosslinking reaction in at least one reactive coating formulation to give an initiated coating formulation having a low viscosity;

b) applying said initiated coating formulation to said area of the substrate surface, and c) allowing the initiated crosslinking reaction to progress to give the coating, wherein the crosslinking reaction of said at least one reactive coating formulation in step a) is initiated optically, and wherein the period of time between the initiation of the cross-linking reaction in step a) and the application of the initiated coating formulation in step b) is adapted to allow the initiated formulation of low viscosity to arrive at the substrate surface and flow out thereon to form a uniform film.

12. The method of claim 11, wherein said reactive coating formulation comprises at least one photoinitiator.

13. The method of claim 11, further comprising after step a) and before step b) at least one of the following additional steps:

a') admixing at least one UV stabilizer to said at least one reactive coating formulation;

a") admixing at least one pigment to said at least one reactive coating formulation.

14. The method of claim 11, wherein the application of said at least one reactive coating formulation before the onset of said at least one crosslinking reaction on said at least one area of said substrate surface in step b) takes place with the aid of a manual spray-gun.

15. The method of claim 11, wherein the crosslinking reaction of said at least one reactive coating formulation in step a) is initiated by UV exposure.

16. The method of claim 11, wherein said crosslinking reaction is kinetically controllable.

17. The method of claim 16, wherein the kinetic control of said crosslinking reaction is effected by at least one of the following:

varying the temperature of said reactive coating formulation, utilizing a crosslinking reaction which proceeds sufficiently slowly, spatially separating said at least one photoinitiator from the coating formulation constituents to be crosslinked, reducing the reactivity of said at least one photoinitiator.

18. The method of claim 17, wherein the spatial separation of said at least one photoinitiator from said coating formulation constituents to be crosslinked is achieved by nanostructuring of the coating formulation.

19. The method of claim 17, wherein said crosslinking reaction a cationic polymerization reaction.

* * * * *